Jan. 22, 1929.  H. F. ELLIOTT  1,699,959
RADIO DIAL OR SCALE
Filed July 31, 1926   2 Sheets-Sheet 1
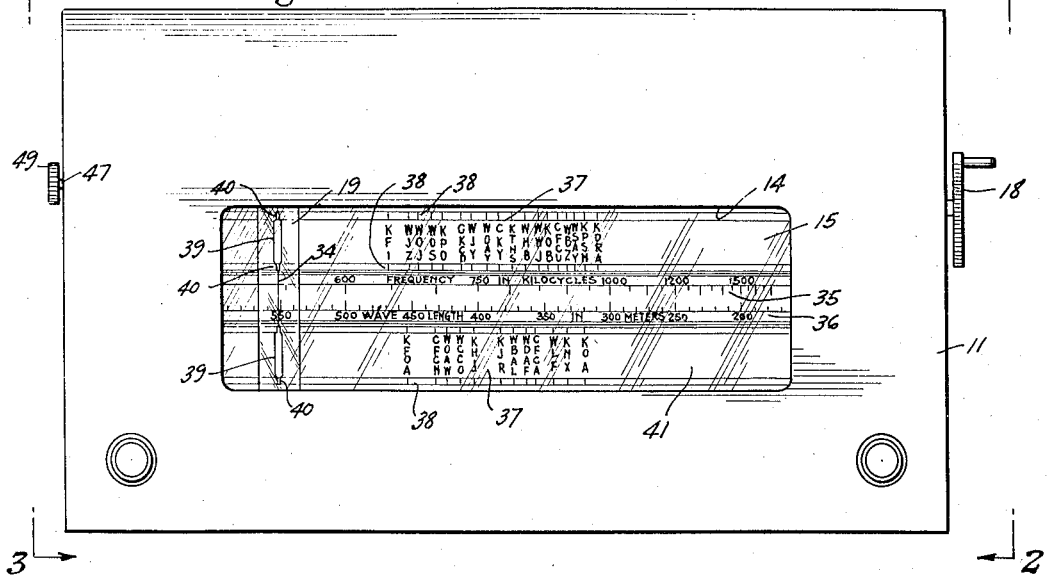
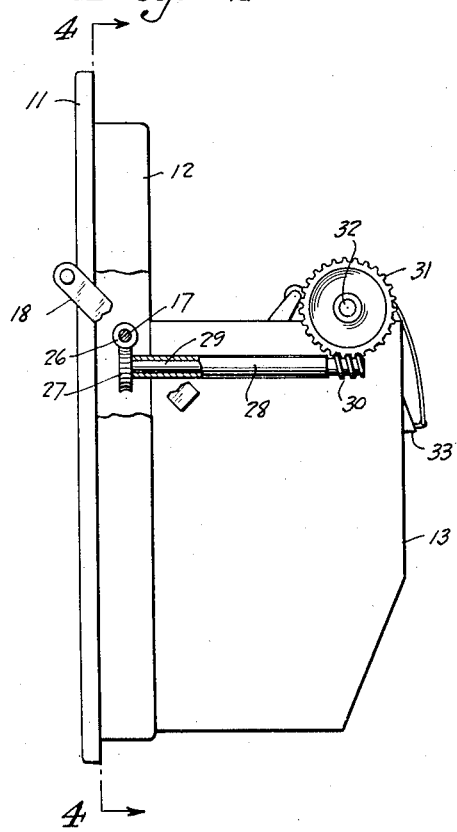
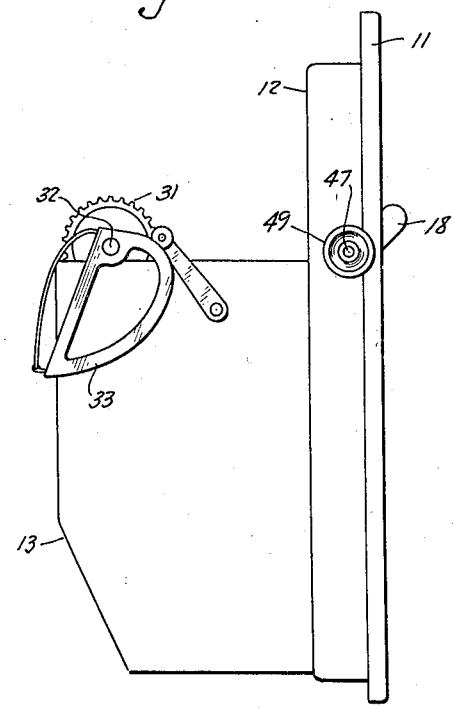
Inventor
Harold F. Elliott
by John Flam
Attorney Jan. 22, 1929.

H. F. ELLIOTT 1,699,959

RADIO DIAL OR SCALE

Filed July 31, 1926 2 Sheets-Sheet 2

Inventor
Harold F. Elliott
by John Flam
Attorney

Patented Jan. 22, 1929.

1,699,959

UNITED STATES PATENT OFFICE.

HAROLD F. ELLIOTT, OF PALO ALTO, CALIFORNIA, ASSIGNOR OF ONE-FOURTH TO JOHN FLAM, OF LOS ANGELES, CALIFORNIA.

RADIO DIAL OR SCALE.

Application filed July 31, 1926. Serial No. 126,247.

This invention relates to radio apparatus, and more particularly to an indicating device, such as a dial, for showing the condition of the circuits associated with the dial.

In radio signaling, it is common to provide several channels of communication by ensuring that little or no interference will be caused between stations operating on different frequencies. This is accomplished by tuning certain of the receiver or transmitter circuits. Dials or scales are usually associated with these circuits to indicate their resonant conditions.

Such dials serving this function broadly are already well-known; perhaps the most common is in the form of a graduated disc rotatable with, or in response to, the movement of a variable tuning element, such as a condenser, the graduations of the dial cooperating with a stationary index to indicate the position thereof. In some instances, clear spaces have been left on the dial on which can be logged, or marked simply the call letters of stations, or else in combination with the wave length or frequency of resonance of the associated tuned circuit. Such dials can be used either for receiving or for sending equipment.

It is one of the objects of my invention to provide a novel form of logging dial having many advantages over the common forms such as outlined above.

It is another object of my invention to provide a logging dial, which, although compactly incorporated in the apparatus, nevertheless provides a large space on which information, such as station call letters, frequencies of resonance, etc. can be marked.

It is still another object of my invention to arrange the scale in such manner that all of it is exposed continuously to view, and in proper position so that any portion of it at all times can be conveniently consulted. In this connection, I provide in place of the usual round scale or dial, a linear scale that is in normal, upright position ready to be read for all positions of the indicator cooperating therewith. It is thus possible to provide a scale substantially coextensive with the panel or board that forms the front of the set.

It is still another object of my invention to provide a logging arrangement that provides ample space for marking the scale even when the logged stations have frequencies that are close together. In the conventional type of round dials, the space for so marking them is necessarily limited.

My invention possesses many other advantages, and has other objects which may be made more easily apparent from a consideration of one embodiment of my invention. For this purpose, I have shown a form in the drawings accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawings:

Figure 1 is a front view of a radio receiving panel embodying my invention;

Fig. 2 is a side elevation thereof, taken from plane 2—2 of Fig. 1;

Fig. 3 is a side elevation taken from plane 3—3 of Fig. 1;

Figure 4:
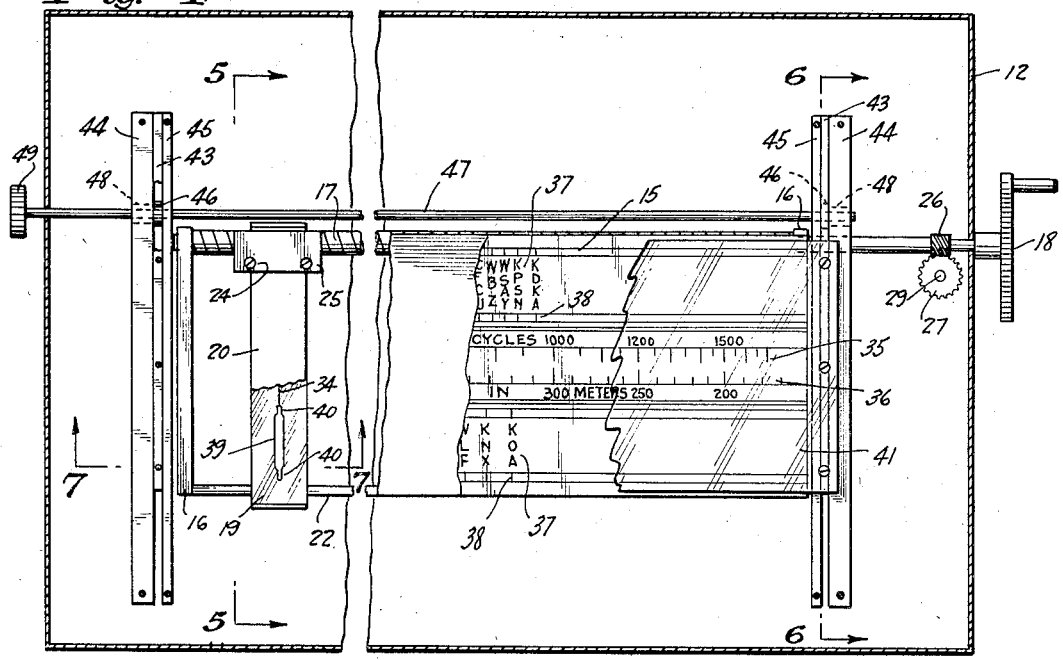
Fig. 4 is an enlarged detail view, partly broken away, and with the panel removed, the view being substantially that taken along plane 4—4 of Fig. 2.

In the present instance, the logging scale is shown as adapted to a receiving set, having a panel 11, indicated as of general rectangular form. In order to enclose the wiring, a metallic sub-base 12 is provided, on the back of which can be supported the various elements, shown as enclosed by the screens 13 (Figs. 3 and 4). In the front of the panel 11, there is a large rectangular opening 14 which exposes a scale 15 to view.

This scale can be of ground glass, celluloid, or the like, and is shown in this instance as supported on a pair of spaced, transverse straps 16. These straps are supported on the inner surface of sub-base 12, and also serve to provide bearings for a long leaa screw 17. This screw is arranged to be operated by a crank 18, fastened to the end of screw shaft 17, which extends through one side of the sub-base 12.

Cooperating with the scale 15 is a pointer arrangement, which is moved by screw 17. This pointer comprises a transparent strip 19, as of celluloid, which extends across the scale 15. It is fastened to a yoke 20, extending back of scale 15, and to which is fastened a nut 21 engaged by screw 17. The yoke 20 is useful in keeping the pointer 19 close to the scale 15. This is accomplished by the aid of a stationary guide 22 (see Fig. 5) which extends between the supporting straps 16 at their bottom, and which is encompassed between the yoke 20, and an upright guide member 23 fastened to the yoke. The screw shaft 17 serves as a corresponding upper guide for the yoke 20. In this manner, the pointer 19 is active over the entire face of dial 15. Nut 21 is held to yoke 20 in any appropriate fashion, as for example by screws 24 which pass through the nut 21, and also serve to hold a retaining member 25 against the screw 17.

The crank 18 of course is also intended to vary, by its movement, the resonance conditions of the radio circuits. This can be accomplished in any well-known manner. For instance, shaft 17 can carry a worm 26 (Figs. 2 and 4) adapted to drive a worm wheel 27. This wheel in turn is fastened to a shaft 29 journaled in a sleeve 28, and carrying a worm 30 for actuating a wheel 31 mounted on shaft 32. This shaft carries the various actuating devices, such as cams 33, for affecting the tuning devices located in the screens 13. The particular manner of tuning is described and claimed in a copending application, Serial No. 119,114, filed in my name on June 28, 1926, and entitled "High frequency tuning system".

The pointer or follower 19 has a mark or hair line 34 thereon which cooperates in this instance with the central portion of scale 15, on which can be marked a frequency scale 35, and a wave length scale 36. As follower 19 is moved, hair line 34 will show on these scales, the frequency and wave length of resonance of the tuned circuits, associated with that particular setting of the apparatus. The scale 15 however, is purposely made wide enough to permit it to be marked with station call letters, such as 37, on either side of the scale, as well as with marks 38 corresponding with the call letters.

In order to facilitate marking the scale with the call letters 37 and the corresponding marks 38, the follower 19 has a pair of apertures 39 which permit the use of a marking implement, such as a pen or pencil, on the scale while the follower 19 is in the position corresponding to the resonance condition of the station being logged. The apertures 39 each have a pair of narrow extensions 40, one at each end, to facilitate making the corresponding markings 38 on the scale 15. These extensions 40 are just wide enough to permit the point of an ordinary writing implement to enter. With the scale 15 thus marked, it is a simple matter to tune in to any of the logged stations, for all that is necessary is to bring any of the slits or extensions 40 directly over that mark 38 which corresponds with the letters 37 of the desired station. This is easy to accomplish, for when this alinement is done, the call letters appear in the larger apertures 39.

Figure 5:
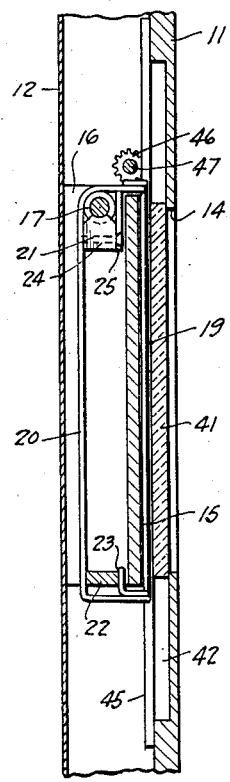
Fig. 5 is a sectional view, taken along plane 5—5 of Fig. 4.
Figure 6:
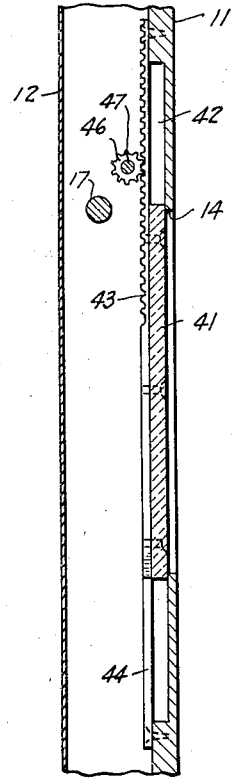
Fig. 6 is a sectional view, taken along plane 6—6 of Fig. 4.
Figure 7:
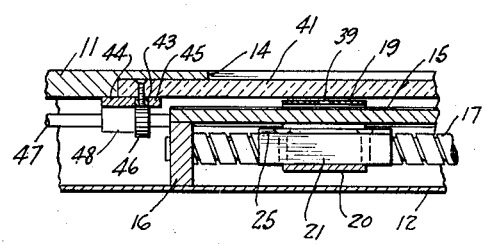
Fig. 7 is a detail sectional view, taken along plane 7—7 of Fig. 4.

Preferably, the scale 15 and the follower 19 should be protected from dust or from accidental disturbances. For this purpose, I use a glass or other transparent plate 41, normally overlying the scale 15 and held in a recess 42 on the inner side of panel 11, and covering the aperture 14. This recess, as clearly shown in Figs. 5 and 6, is wider than the cover plate 41, in order to permit this cover to be moved upwardly or downwardly to expose respectively the lower and upper half of the scale 15, so that it may be logged in the manner hereinbefore described.

The sliding of plate 41 either up or down can be accomplished mechanically. For example, a pair of racks 43, one adjacent each side of the cover 41, can be fastened thereto. These racks can slide between the guides 44 and 45 fastened to the back of panel 11. A pinion 46 engages each of the racks, and can be rotated by the aid of the shaft 47, the pinions being fastened thereto. The shaft 47 is journaled in bearings 48 carried by guides 44 and 45, and extends toward the left, beyond and through the side of sub-base 12. A manually rotatable knob 49 on the extension of this shaft serves to operate the cover moving mechanism. The cover 41 is retained in the central position shown by friction between it and its guiding means, comprising recess 42 and guides 44 and 45.

It is evident from the foregoing that I have provided a simple and inexpensive logging scale for radio frequency circuits, such as wave meters, receivers and transmitters. There is ample space for marking stations, even when they are rather closely spaced in other forms of dials. All of the call letters (and in fact the entire scale) are exposed to view in a convenient position for reference.

I claim:

1. In combination, a flat scale, a support therefor, a pointer movable over the scale, a transparent cover for the scale, and means for moving the cover transversely to the scale so as to expose at least part of the scale.

2. In combination, a flat scale, a support therefor, a pointer movable longitudinally over the scale, a transparent cover for the scale, and means for moving the cover so as to expose at least part of the scale, comprising a rack and pinion movement operating to move the cover transversely of the scale.

3. In combination, a panel having an opening, a stationary scale supported adjacent the opening, an indicator arranged to traverse the scale, a transparent cover for the scale located in a recess in the back of the panel, said recess being wider than the cover whereby it can be shifted laterally of the scale, a pair of racks supported on the back of the cover, guides for the racks, pinions engaging the racks, and means for rotating the pinions for moving the cover laterally.

In testimony whereof I have hereunto set my hand.

HAROLD F. ELLIOTT.